United States Patent
Kubicz (12)

(10) Patent No.: US 6,193,407 B1
(45) Date of Patent: Feb. 27, 2001

(54) BATTERY-OPERATED LIQUIFIER

(75) Inventor: Edward M. Kubicz, Torrington, CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/164,036

(22) Filed: Sep. 30, 1998

(51) Int. Cl.[7] .................................................. A47J 43/046
(52) U.S. Cl. ............................................ 366/205; 366/206
(58) Field of Search ..................................... 366/197, 205, 366/206, 314; 241/282.1, 282.2; 99/348; 429/9, 96–100

(56) References Cited

U.S. PATENT DOCUMENTS

| | | |
|---|---|---|
| 2,740,029 | 3/1956 | Kueser et al. ........................ 366/205 |
| 3,912,892 | 10/1975 | Morehouse . |
| 3,979,228 | 9/1976 | Marchetti . |
| 4,206,274 | 6/1980 | Peels . |
| 4,269,908 | 5/1981 | Stemme . |
| 4,391,883 | 7/1983 | Williamson et al. . |
| 4,455,466 | 6/1984 | Wilson . |
| 4,487,509 | 12/1984 | Boyce . |
| 4,531,027 | 7/1985 | Vogt et al. . |
| 4,887,909 | 12/1989 | Bennett . |
| 4,947,439 | 8/1990 | Buettner . |
| 4,965,141 | 10/1990 | Suzuki . |
| 5,023,417 | 6/1991 | Magiera . |
| 5,051,550 | 9/1991 | Harris . |
| 5,206,098 | 4/1993 | Cho et al. ............................... 429/96 |
| 5,319,996 | 6/1994 | Harris . |
| 5,337,215 | 8/1994 | Sunderland et al. . |
| 5,372,395 | 12/1994 | Yang ..................................... 429/100 |
| 5,567,049 | 10/1996 | Beaudet et al. . |
| 5,639,161 | 6/1997 | Sirianni . |
| 5,644,114 | 7/1997 | Neaves . |
| 5,720,552 | 2/1998 | Schindlegger ........................ 366/197 |
| 5,882,113 | 3/1999 | Binder .................................. 366/197 |
| 5,911,504 | 6/1999 | Schindlegger, Jr. ................. 366/197 |

FOREIGN PATENT DOCUMENTS 562310    9/1993   (EP) ..................................... 366/205

Primary Examiner—Charles E. Cooley
(74) Attorney, Agent, or Firm—Barry E. Deutsch

(57) ABSTRACT

A liquifier includes a liquifier jar mounted on a base. The base has an open bottom end to which a rigid frame member is secured. An elastomer cover is secured to a bottom surface of the rigid frame member. The cover has a pivotal door formed therewith. The door has a hinge formed integral with said cover. A rocker switch is pivotably mounted within the base. The rigid frame member includes a follower extending into the path of movement of the rocker switch. When the rocker switch is pivoted into engagement with the follower, the switch is turned into an on state for actuating the liquifier. A first portion of the cover is in spaced relation to the frame member to form a battery compartment therebetween. At least one removable battery is positioned in said battery compartment

20 Claims, 5 Drawing Sheets

BATTERY-OPERATED LIQUIFIER

BACKGROUND OF THE INVENTION

This invention relates to a liquifier and, in particular, to one which is water-resistant, skid-resistant and drop-resistant. Still more specifically, the present invention is particularly related to a portable liquifier which can operate on replaceable batteries.

A liquifier or blender driven by rechargeable batteries provides the user with a distinct portability advantage. In particular, a cordless blender may be used anywhere, such as back yards, beaches, on boats, or at a pool side. Battery operated liquifiers that were previously marketed, however, suffered from limitations, such as the rechargeable batteries not being replaceable by the user. Such portable liquifiers also had limited water-resistance.

It is, therefore, an object of this invention to provide a portable liquifier which can operate on replaceable, rechargeable batteries and is particularly water-resistant, skid-resistant, and drop-resistant.

SUMMARY OF THE INVENTION

The foregoing object and other objects of the invention are attained in a liquifier having a base member. The base member includes a housing having an upstanding wall, a support surface at an upper end of the upstanding wall, and a substantially open bottom end. A liquifier jar is mounted on the support surface of the base member. A rigid frame member is attached to the housing member for substantially closing the open bottom end of the housing member. An elastomer cover is secured to the bottom surface of the frame member and includes a first portion in spaced relation to the bottom surface of the frame member to form a battery compartment therebetween. The cover has a pivotal door formed therewith. A hinge for the pivotal door is formed integral with the cover.

The liquifier preferably includes at least one removable battery in the battery compartment. The battery is preferably rechargeable. A portion of the battery in the battery compartment underlies a flange-like surface of the door for maintaining the door in its closed position.

The liquifier preferably includes a rocker switch pivotally mounted within an opening formed by the housing wall. A lever extends from an outer surface of the housing wall and is connected to the switch for pivoting the switch between on and off positions. A follower extends from the frame member into the path of movement of the switch, with engagement of the switch with the follower turning the switch on.

DESCRIPTION OF THE PREFERRED EMBODIMENT

Figure 1:
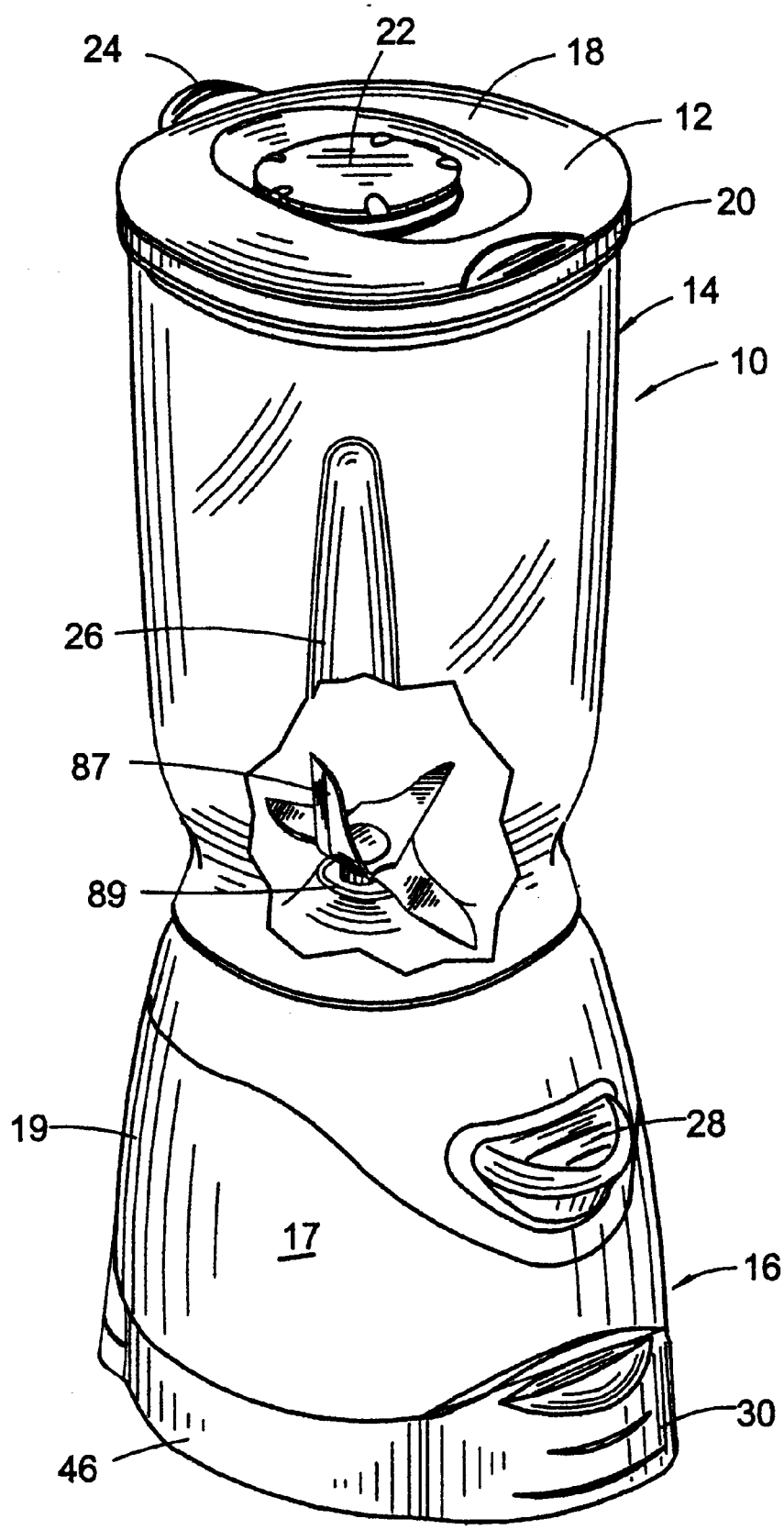
FIG. 1 is a perspective view of a liquifier embodying the present invention, with a portion of the liquifier jar broken away for the purpose of illustrating internal elements.

Referring now to the various figures of the drawing, a preferred embodiment of the present invention will be described. In referring to the various figures of the drawing, like numerals shall refer to like parts.

Referring specifically to FIG. 1, there is shown a liquifier 10 including a lid 12, a liquifier jar 14, and a base 16. Lid 12 is preferably formed from an elastomeric material, such as "SANTOPRENE" sold by Advanced Elastomer Systems. Jar 14 includes a circumferentially extending band 20 connected to the upper end of the jar. Band 20 is preferably formed from the same material as lid 12 and is joined to the lid by tether loop 24, thus securing the lid to the jar. Lid 12 also includes a plastic cylindrical cup 22 extending upward from its upper surface. Cup 22 forms an integral measuring glass with the lid.

Jar 14 is made from a plastic material, such as "LEXAN" sold by the General Electric Company. The jar is translucent and includes circumferentially spaced vertically extending ribs 26. Ribs 26 are provided to increase the efficiency of the mixing function of liquifier 10.

Figure 4:
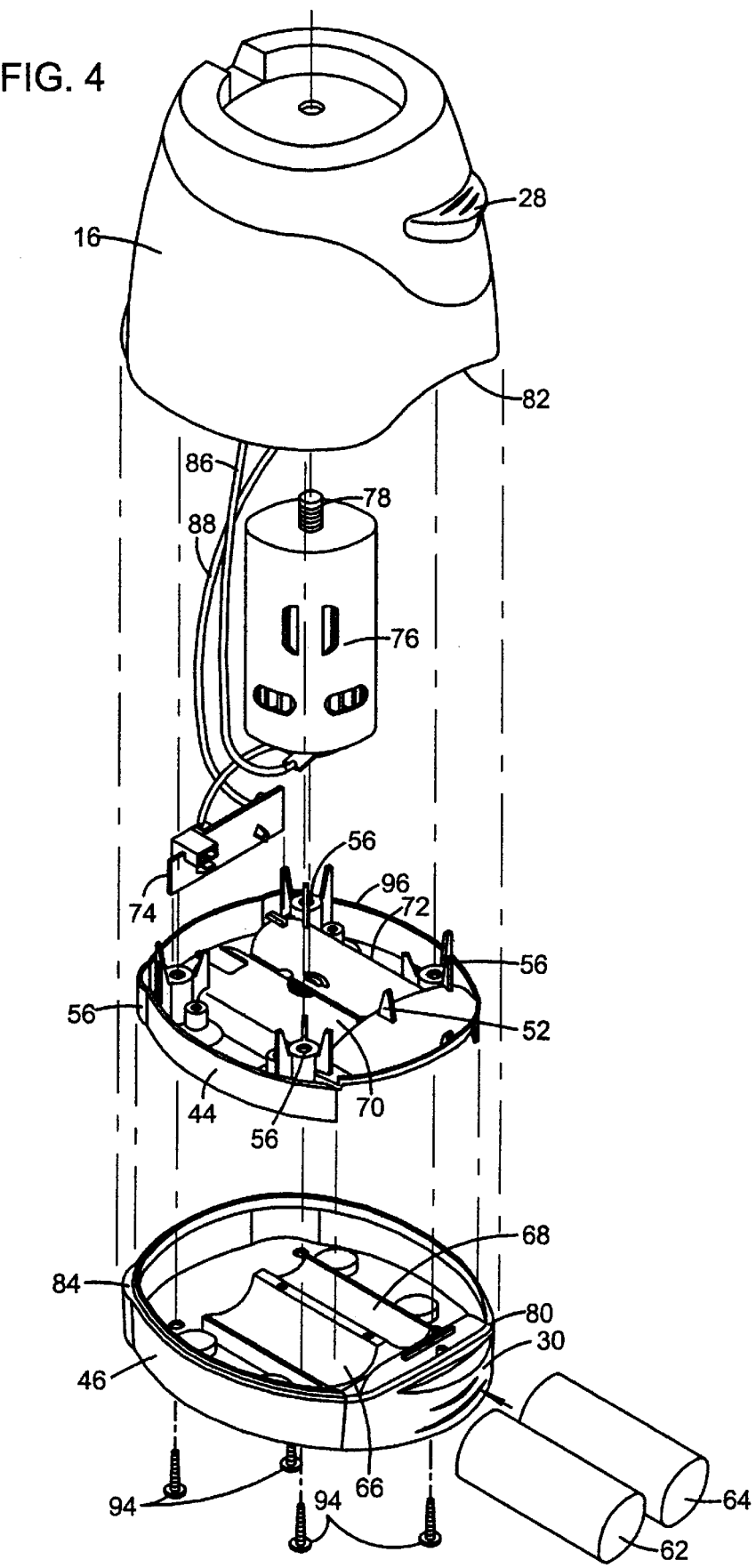
FIG. 4 is an exploded perspective view of the base portion of the liquifier shown in FIG. 1.
Figure 5:
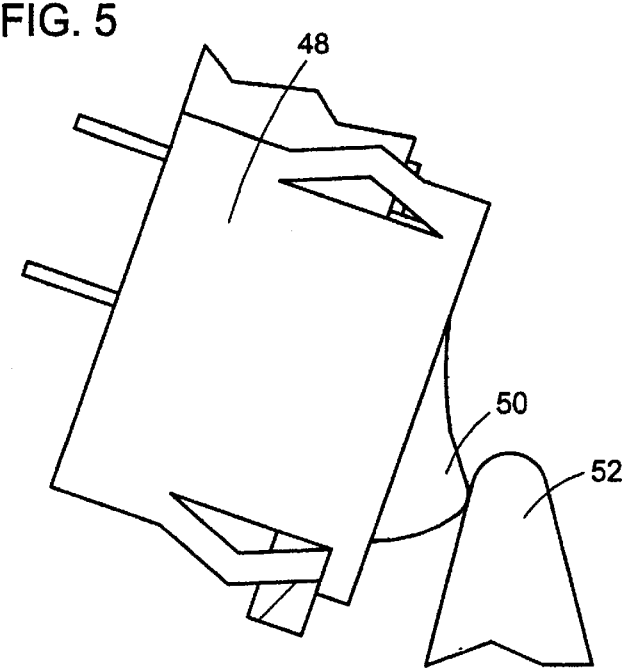
FIG. 5 is an enlarged detail view of the rocker switch employed in the liquifier shown in FIG. 1.
Figure 6:
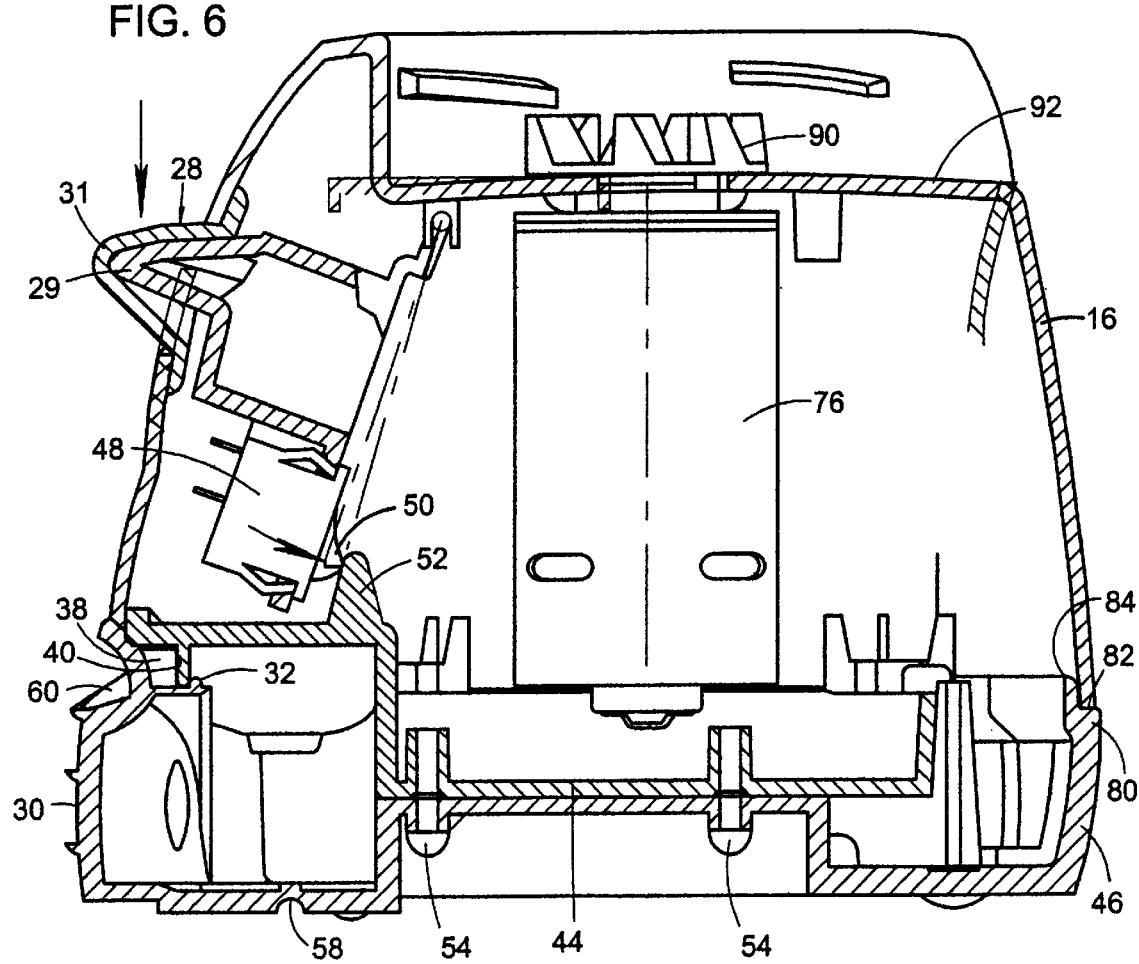
FIG. 6 is an enlarged cross-sectional view of the base portion of the liquifier further illustrating details thereof.

Jar 14 is connected to base 16 through means such as mating screw threads or the like. Base 16 includes a housing portion 17 having an upstanding wall 19. A switch arm 28 extends through a face of housing 17. As shown in FIG. 6, the portion of switch arm 28 extending through housing 17 is covered by an elastomeric seal 31. As shown in FIG. 4, housing 17 includes a substantially open bottom end. A cover 46 formed from an elastomeric material, such as "SANTOPRENE" sold by Advanced Elastomer Systems, in association with a support frame 44 seals the open end of housing 17. Cover 46 includes a door 30, which is pivotally attached thereto via integrally formed hinge 58 (shown in FIGS. 2 and 6).

Figure 2:
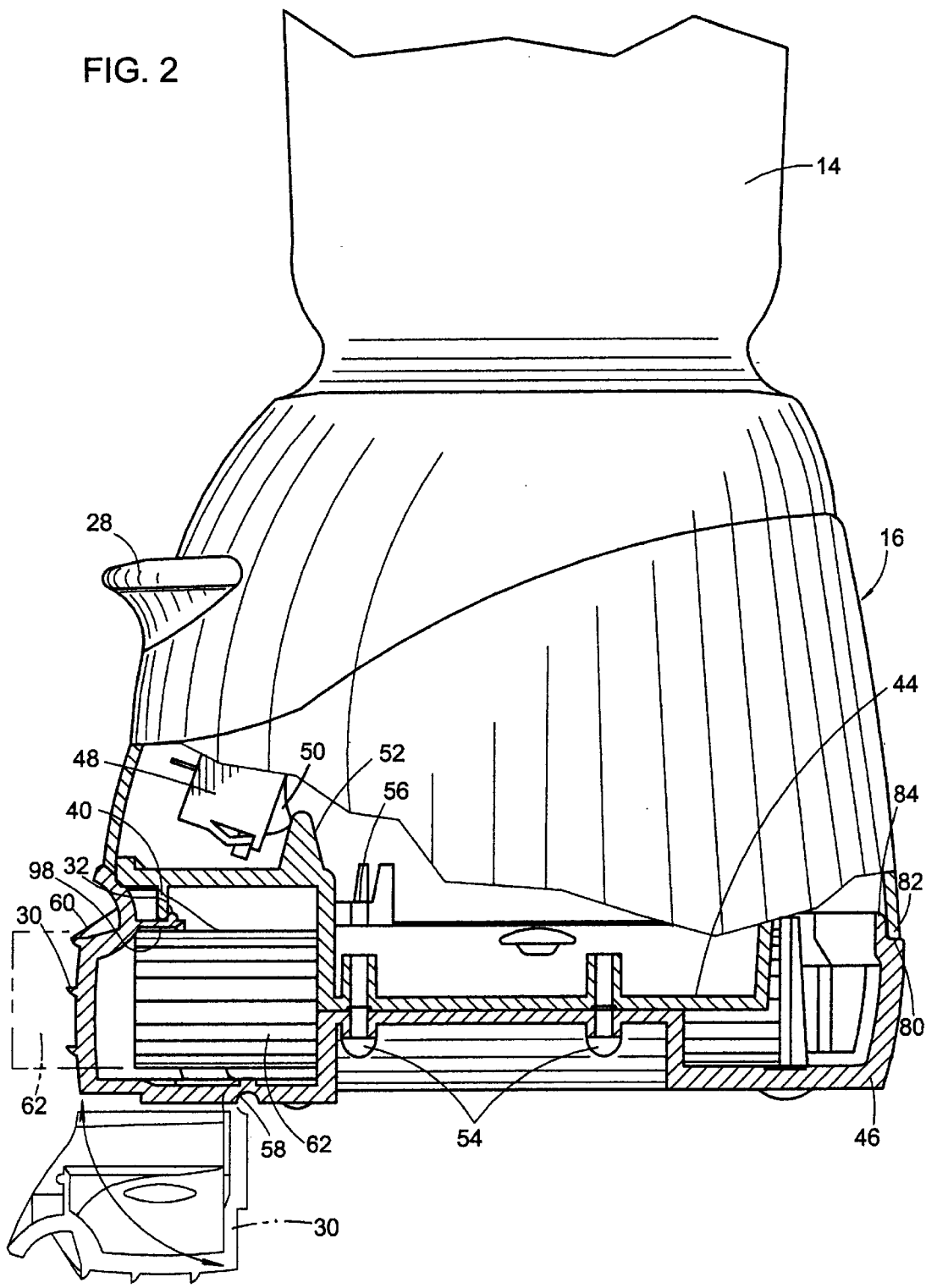
FIG. 2 is a side elevational view, partially in section, of a portion of the liquifier shown in FIG. 1.

Referring specifically now to FIGS. 2 through 4 and 6, further details of cover 46, support frame 44 and base 16 shall now be described. As shown in FIG. 2, door 30 is pivotally moveable between a closed position (shown in full line) and an open position (shown in phantom). When door 30 is in its closed position, it completes the seal formed by cover 46. When the door is in its open position, it permits the user to gain access to battery compartments 40, 41. Rechargeable batteries 62, 64 (shown in FIG. 4) are readily insertable by the user within battery compartments 40, 41.

Cover 46 is attached by such means as screws 54 to support frame 44. Cover 46 circumferentially surrounds support frame 44 and the combination of the two members 44, 46 close off the open bottom end of housing 17. In FIG. 2, battery 62 is illustrated within one of the battery compartments.

Support frame 44 includes a plurality of circumferentially spaced bosses 56. Support frame 44 also includes an upwardly extending finger 52 for a reason to be more fully described hereinafter.

Battery compartments 40, 41 are formed by lower semi-circular members 66, 68 formed in cover 46 and upper semi-circular members 70, 72 formed in support frame 44. The end of battery compartments 40, 41 remote from door 30 is open and is closed by terminal block 74. Block 74 is connected to electrical conductors 86, 88, which are in turn connected to motor 76. Conductors 86, 88 deliver electrical power from batteries 62, 64 to motor 76. Switch 48 is pivotally mounted within housing 17 and is electrically connected to conductor 88 to control the supply of electrical power from batteries 62, 64 to motor 76. Switch 48 includes on/off button 50. Switch 48 is attached to lever 29 of switch arm 28, which in turn is surrounded by an elastomeric seal 31. When liquifier 10 is in an inoperative state, switch button 50 is spaced from finger 52.

Motor 76 includes an upstanding drive shaft 78, which in turn is connected to drive coupling 90 mounted in the center of support surface 92 of base 16. Jar 14 includes a blade 87 and a coupling 89 for mating with coupling 90. Energization of motor 76 results in rotation of the blade in a manner well known to those skilled in the art. Motor 76 is secured to the upper inside surface of housing 17 via a support frame (not shown for purposes of clarity), which in turn is secured via screws 94 to bosses 56 of support frame 44.

The combination of support frame 44 and cover 46 provide water-resistance to minimize the entrance of water into the battery compartments and into the inner portion of housing 17, wherein motor 76 is supported. To achieve the water-resistance, cover 46 includes a substantially circumferentially extending lip 80 formed by a radially inwardly offset vertical flange 84. Base 16 includes a rim 82 which is seated on lip 80 in sealing engagement therewith. Frame 44 includes an upstanding substantially circumferentially extending surface 96, which is in supporting relationship with a lower surface of lip 80 of cover 46. As shown in particular in FIG. 2, batteries 62, 64, when placed in their battery compartments 40, 42, underlie a flange-like surface 98 of door 30 to assist in maintaining the door in a closed position.

Figure 3:
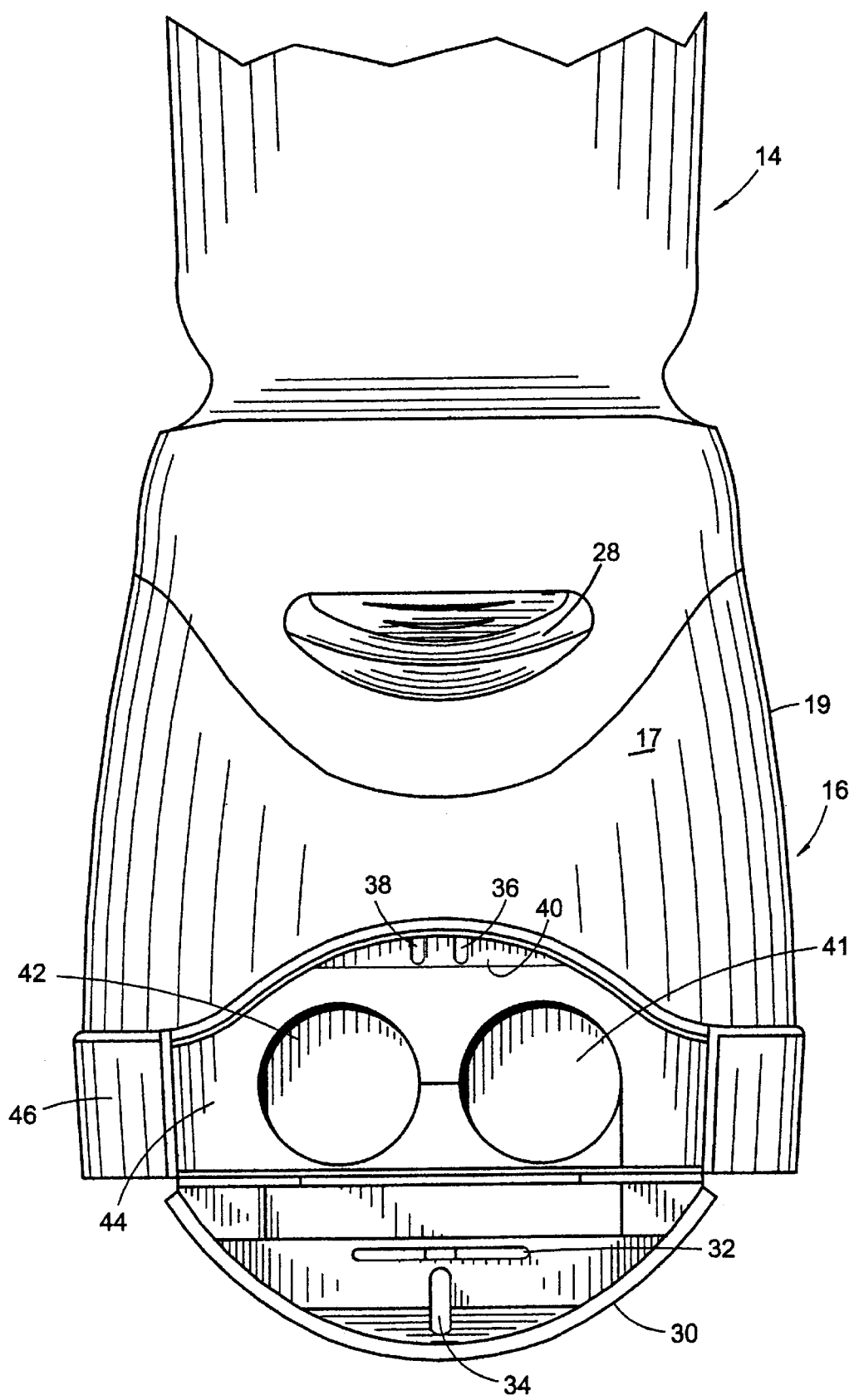
FIG. 3 is a partial front elevational view of the liquifier with the cover thereof shown in an open position.

Referring to FIG. 3, door 30 includes a laterally extending first rib 32. Support frame 44 includes a laterally extending second rib or arm 40. Rib 40 includes a pair of longitudinally extending, spaced tabs 36, 38. The inner surface of door 30 includes a finger 34. As shown in FIGS. 2 and 6, when the door is in its closed position, first and second ribs 32, 40 are in abutting, latching relationship. Further, finger 34 is compressively received within the opening formed between spaced tabs 36, 38. The combination of ribs 32, 40 and finger 34 and tabs 36, 38 retain door 30 in its closed position.

In operation, the user initially places door 30 in its open position. An indentation 60 is provided in the surface of door 30 and functions as a finger grip as a convenience aid for the user in pivoting door 30. The user then inserts batteries 62, 64 into their respective battery compartments.

To turn the liquifier on, the user activates switch arm 28 by pivoting the arm in a counterclockwise direction. The user actually engages seal 31, which in turn, through its inter-engagement with lever 29 of switch 48, causes the switch to rotate in a counterclockwise direction. When switch 48 is in an off state, on/off button of switch 48 is spaced from finger 52. Finger 52 functions as a follower with respect to button 50. When switch 48 is rotated in a counterclockwise direction, on/off button 50 moves into abutting relationship with follower 52, which causes the switch to be moved into its on state. With switch 48 in its on state, electrical power is supplied from batteries 62, 64 through conductors 86, 88 to motor 76. Motor 76 in turn rotates coupling 90, which, as known to those skilled in the art, rotates the mating coupling from the blender jar and results in the blending action with respect to the ingredients placed into the blender jar 14 by the user.

While a preferred embodiment of the present invention has been described and illustrated, the invention should not be limited thereto but may be otherwise embodied within the scope of the following claims.

What is claimed is:

1. A liquifier comprising:
   a base member, including a housing, having an outer upstanding wall, a support surface at an upper end of said upstanding wall, and a substantially open bottom end;
   a liquifier jar mounted on the support surface of said base member;
   a stirring blade rotatable mounted in the jar;
   a rigid frame member attached to the base member for substantially closing the open bottom end of said base member; and
   an elastomer cover secured to a bottom surface of the frame member and having a first portion in spaced relation to said frame member bottom surface to form a battery compartment therebetween, said cover having a pivotal door formed therewith, a hinge for said pivotal door being formed integral with said cover.

2. A liquifier in accordance with claim 1 wherein said door has a first lib and said frame has an arm, said rib and said arm being in abutting latching relationship with the door in a closed position.

3. A liquifier in accordance with claim 2 including at least one removable battery in said battery compartment.

4. A liquifier in accordance with claim 3 wherein said battery is rechargeable.

5. A liquifier in accordance with claim 4 wherein said door includes a flange-like surface, with a portion of the battery in the battery compartment underlying said flange-like surface for maintaining said door in the closed position.

6. A liquifier in accordance with claim 5 wherein said cover includes a substantially circumferentially extending lip formed by a radially inwardly offset, vertical flange and said base member includes a rim seated on said lip.

7. A liquifier in accordance with claim 6 wherein said frame member includes an upstanding substantially circumferentially extending finger in supporting relationship with a lower surface of said cover lip.

8. A liquifier in accordance with claim 7 further including a rocker switch pivotally mounted within said housing wall; a lever extending from an outer surface of the housing wall and connected to the switch for pivoting the switch between on and off positions; and a follower extending from the frame member into the path of movement of said switch, with engagement of said switch with said follower turning said switch on.

9. A liquifier in accordance with claim 1 wherein said cover includes a substantially circumferentially extending lip formed by a radially inwardly offset, vertical flange and said base member includes a rim seated on said lip.

10. A liquifier in accordance with claim 9 wherein said frame member includes an upstanding substantially circumferentially extending finger in supporting relationship with a lower surface of said cover lip.

11. A liquifier in accordance with claim 10 further including a rocker switch pivotally mounted within said housing wall; a lever extending from an outer surface of the housing wall and connected to the switch for pivoting the switch between on and off positions; and a follower extending from the frame member into the path of movement of said switch, with engagement of said switch with said follower turning said switch on.

12. A liquifier in accordance with claim 1 wherein said frame member includes an upstanding substantially circumferentially extending finger in supporting relationship with a surface of said cover.

13. A liquifier in accordance with claim 12 further including a rocker switch pivotally mounted within an opening formed by said housing wall; a lever extending from an outer surface of the housing wall and connected to the switch for pivoting the switch between on and off positions; and a follower extending from the frame member into the path of movement of said switch, with engagement of said switch with said follower turning said switch on.

14. A liquifier in accordance with claim 1 further including a rocker switch pivotally mounted within said housing wall; a lever extending from an outer surface of the housing wall and connected to the switch for pivoting the switch between on and off positions; and a follower extending from the frame member into the path of movement of said switch, with engagement of said switch with said follower turning said switch on.

15. A liquifier comprising:
  a base member, including a housing, having an outer upstanding wall, a support surface at an upper end of said upstanding wall, and a substantially open bottom end;
  a liquifier jar mounted on the support surface of said base member;
  a stirring blade rotatable mounted in the jar;
  a rigid frame member attached to the base member for closing the open bottom end;
  an elastomer cover secured to a bottom surface of the rigid frame member; and
  a rocker switch pivotally mounted within the base member, a lever extending from an outer surface of the base member and connected to the switch for pivoting the switch between on and off positions, and a follower extending from the frame member into the path of movement of said switch, with engagement of said switch with said follower turning said switch on.

16. A liquifier comprising:
  a base member, including a housing, having an outer upstanding wall, a support surface at an upper end of said upstanding wall, and a substantially open bottom end;
  a liquifier jar mounted on the support surface of said base member;
  a stirring blade rotatably mounted in the jar;
  a rigid frame member attached to the base member for substantially closing the open bottom end of said base member; and
  an elastomer cover secured to a bottom surface of the frame member and including a pivotal door formed therewith, a hinge for said door being formed integral with said cover.

17. A liquifier in accordance with claim 16 wherein said door includes an upstanding rib and said frame has a downwardly extending arm, said rib and said arm being in abutting latching relationship with the door in a closed position.

18. A liquifier in accordance with claim 17 wherein said cover includes a substantially circumferentially extending lip formed by a radially inwardly offset, vertical flange and said base member includes a rim seated on said lip.

19. A liquifier in accordance with claim 18 wherein said frame member includes an upstanding substantially circumferentially extending finger in supporting relationship with a lower surface of said lip.

20. A liquifier in accordance with claim 19 including a rocker switch pivotally mounted within the base member, a lever extending from an outer surface of the base member and connected to the switch for pivoting the switch between on and off positions, and a follower extending from the frame member into the path of movement of said switch, with engagement of said switch with said follower turning said switch on.

* * * * *